United States Patent [19]

Colomès

[11] 4,090,070
[45] May 16, 1978

[54] SOLAR POINTER

[75] Inventor: Jacques Colomès, Palaiseau, France

[73] Assignee: Commissariat a l'Energie Atomique, Paris, France

[21] Appl. No.: 778,609

[22] Filed: Mar. 17, 1977

[30] Foreign Application Priority Data

Mar. 26, 1976 France .............................. 76 08829

[51] Int. Cl.² .............................................. G01J 1/20
[52] U.S. Cl. .................................. 250/203 R; 356/141
[58] Field of Search ................... 250/203 R, 234, 235, 250/236; 356/141, 152, 1, 4, 5; 244/3.16

[56] References Cited

U.S. PATENT DOCUMENTS 3,591,260  7/1971  Harrington et al. .................. 356/141
3,717,413  2/1973  Kubo et al. ...................... 250/203 R
3,804,976  4/1974  Gard .................................... 250/236

Primary Examiner—David C. Nelms

[57] ABSTRACT

Two pyrheliometers each carry out periodic scanning in a plane at right angles to one of the two perpendicular axes of pivotal displacement of the solar pointer. Each pyrheliometer is associated with means for measuring the angular difference between the direction of the sun projected on the scanning plane and the direction of the pointing axis projected on the same plane and for delivering a pointing error signal which is proportional to the angular difference. The error signal obtained in each scanning plane is applied to a motor for the pivotal displacement of the pointer so that the pointing axis is directed towards the sun when both error signals have been cancelled.

9 Claims, 6 Drawing Figures

SOLAR POINTER

This invention relates to a solar pointer and is employed in metrology of solar radiation, especially for automatic control of orientation of instruments designed for the utilization or study of solar radiation.

The solar pointer in accordance with the present invention is capable of pivoting about two perpendicular axes, each pivotal movement about one axis being controlled by a motor; the pointer further comprises two pyrheliometers for carrying out in each case periodic scanning in a plane at right angles to one of the two pivotal axes aforesaid. Each pyrheliometer comprises a receiving unit which rotates about an axis at right angles to the scanning plane and is associated with means for measuring the angular difference between the direction of the sun projected on the scanning plane and the direction of the pointing axis projected on the same plane and for delivering an electrical pointing error signal which is proportional to said angular difference; the error signal obtained in each scanning plane is applied to the motor which serves to drive the pointer in pivotal motion about the axis located at right angles to said scanning plane in order to initiate pivotal displacement of the pointer, thereby cancelling said error signal; the pointing axis of the pointer is accordingly directed towards the sun when the two error signals have thus been cancelled.

The solar pointer in accordance with the invention preferably comprises means for delivering an electrical reference pulse when the optical means rigidly fixed to the hollow rotating tube are oriented in the direction of the pointing axis; in this case the error signal is constituted by a signal which is proportional to the time interval between the instants of appearance of the measuring pulse and of the reference pulse.

In an alternative form of construction, the means for delivering the reference pulse comprise a light source and a photoelectric detector aligned in a direction parallel to the pointing axis and a collimation system placed between the source and the detector and driven in the same movement of rotation as the hollow tube. By way of example, said collimation system can be constituted by two diametrically opposite slits pierced in a hollow rotating cylinder which is rigidly fixed to the hollow rotating tube of the pyrheliometer. Under these conditions, the receiver receives the light emitted by said source at each revolution of the tube and delivers the reference pulse at this instant.

Each pyrheliometer can be constituted by an instrument of known type. However, in order to improve the scanning accuracy, the pyrheliometers advantageously have a collimating slit which is of substantial length in the direction parallel to the axis of rotation of the hollow tube and of small width in the perpendicular plane. The presence of said collimating slit has the effect of reducing the degree of diffuse perisolar radiation and thus improves the accuracy of pointing. Accordingly, the aperture of the field swept by the pyrheliometer has a rectangular cross-section and no longer has a conical shape as in conventional heliographs. By way of example, the longitudinal divergence angle can be reduced to approximately 2° while maintaining a wide azimuthal divergence angle of the order of 50° in order to take into account seasonal variations in declination of the sun.

The axis of rotation of one of the pyrheliometers is preferably parallel to the earth's axis, with the result that the corresponding scansion takes place in the equatorial plane of the locus whilst the other scansion takes place in a meridian plane.

The characteristic features and advantages of the present invention will in any case become more fully apparent from the following description of examples of construction which are given by way of explanation and not in any sense by way of limitation, reference being made to the accompanying drawings, wherein.

Figure 1:
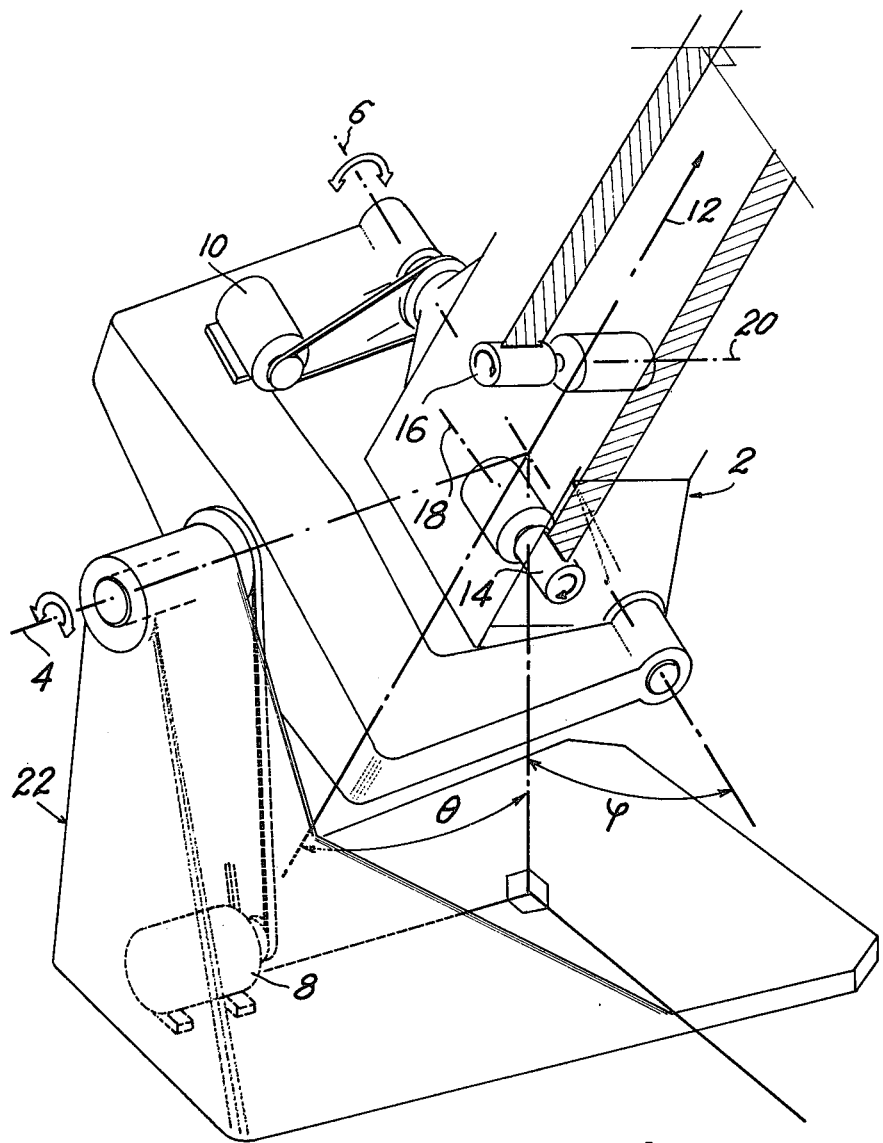
FIG. 1 is a diagrammatic illustration of the structure of the pointer in accordance with the invention.

The structure of the solar pointer in accordance with the invention is illustrated diagrammatically in FIG. 1. The pointer 2 is mounted so as to be capable of carrying out pivotal movements about two perpendicular axes 4 and 6 under the control of motors 8 and 10 respectively. As a result of these movements, the pointing axis 12 of the pointer 2 can be oriented in any direction in space. In the following description, $\phi$ will designate the angle of pivotal displacement of the pointing axis about the axis 4 and $\theta$ will designate the angle of pivotal displacement about the axis 6.

The pointer 2 comprises two pyrheliometers 14 and 16 which are each intended to carry out a periodic scan in a plane at right angles to one of the two pivotal axes 4 and 6. The pyrheliometer 14 carries out a scan in a plane at right angles to the axis 18 which is parallel to the pivotal axis 6. The pyrheliometer 16 performs a scan in a plane at right angles to the axis 20 which is parallel to the pivotal axis 4. The pyrheliometer 14 therefore performs a scan through the angle $\theta$ and the pyrheliometer 7 performs a scan through the angle $\phi$.

Each scan in one plane produces signals which are employed for controlling the pivotal displacement of the pointer about its axes 4 and 6 in order to bring the pointing axis 12 to the desired position. The pyrheliometer 14 thus controls the motor 10 which initiates the movement of rotation through the angle $\theta$ and the pyrheliometer 16 controls the motor 8 which initiates the movement of rotation through the angle $\phi$. A frame 22 which is shown diagrammatically supports different units such as the motors 8 and 10 and current-supply devices which are not illustrated and do not form part of the invention.

Figure 2:
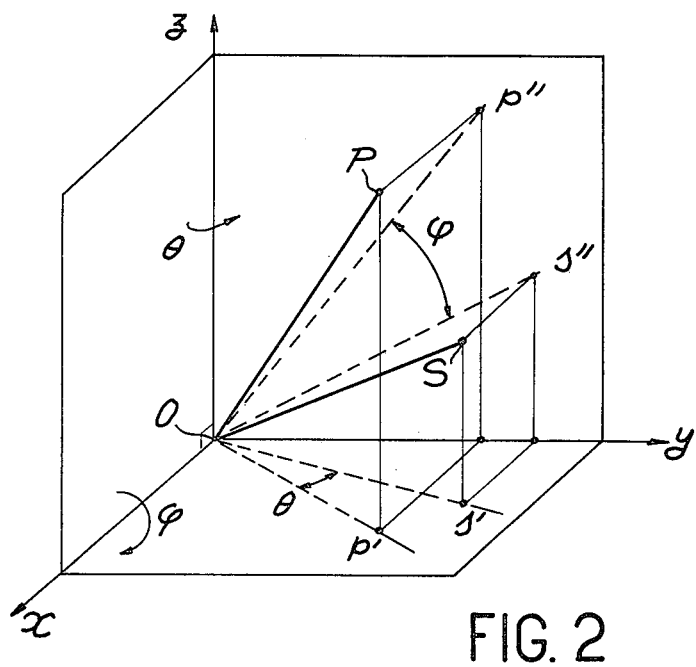
FIG. 2 is a diagram illustrating the two angular corrections made by the pointer.

In accordance with known practice, a direction can be determined in three-dimensional space by means of two angular coordinates. In a trirectangular reference system as shown in FIG. 2, this direction-finding operation can be performed in the following manner. It is postulated that the solar pointing system is located at the origin O of the trirectangular trihedron O$xyz$; the sun occupies the position S and the direction of pointing of the pointer is designated as OP. In the plane $oxy$, the directions OS and OP are projected respectively along the lines O$s'$ and O$p'$. In the perpendicular plane $yoz$, these directions are projected along the lines O$s''$ and O$p''$.

Should it be desired to ensure that the direction OP coincides with the direction OS, the projection O$p'$ must be rotated through an angle $\theta$ in order to be brought onto the line O$s'$ and the projection O$p''$ must be rotated through an angle $\phi$ in order to be brought onto the line O$s''$. The rotational displacement through the angle $\theta$ takes place as a result of a rotational displacement of the same value about the axis O$z$ and the rotational displacement through the angle $\phi$ takes place about the axis O$x$.

The solar pointer in accordance with the invention carries out these two angular corrections respectively by means of the motor 10 for producing pivotal motion about the axis 6 of FIG. 1 which corresponds to the axis O$z$ of FIG. 2 and by means of the motor 8 for producing pivotal displacement through the angle $\phi$ about the axis 4 which corresponds to the axis O$x$ of FIG. 2. In other words, the pointer carries out two correspondence control operations in which the projection of the pointing direction is brought onto the projection of the direction of the sun in each scanning plane. When these two control operations have been performed, the pointing direction OP coincides with the direction OS of the sun.

Figure 3:
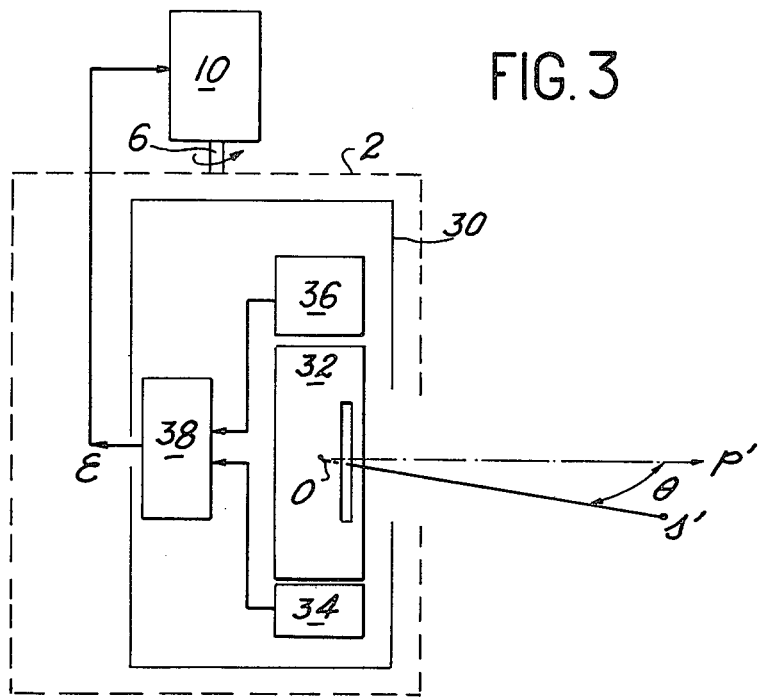
FIG. 3 is a block diagram of the control loops.

Each correspondence control of the pointing direction in dependence on the direction of the sun is carried into effect by means of a control loop, the principle of which is given in FIG. 3. In this figure, a pyrheliometer is designated by the reference 30 and comprises a rotary receiving unit 32 (the structure of which will be given in detail hereinafter), a device 34 for receiving the sun's rays and reference means 36 for determining the direction of the pointing axis O$p'$. The receiving device 34 delivers a signal which is a function of the angular position of the direction O$s'$ of the sun and the means 36 deliver a signal which is a function of the angular position of the pointing direction O$p'$. The electronic means 38 receive these two signals and deliver an error signal $\epsilon$ which is a function of the angular difference $\theta$ between the directions O$p'$ and O$s'$. This error signal is applied to the motor 10 which produces a rotational displacement of the solar pointer about the pivotal axis 6 through the angle $\theta$. The angular difference $\theta$ between the directions O$p'$ and O$s'$ is then nullified, the error signal $\epsilon$ is reduced to zero and the pivotal motion of the pointer is discontinued.

The same correspondence control loop is employed for controlling the projection O$p''$ in dependence on O$s''$ by means of an error signal which initiates the operation of the motor 8 and rotational motion about the axis 4 through the angle $\phi$. These two correspondence control operations are combined with a view to finally directing the pointing axis towards the sun.

Figure 4:
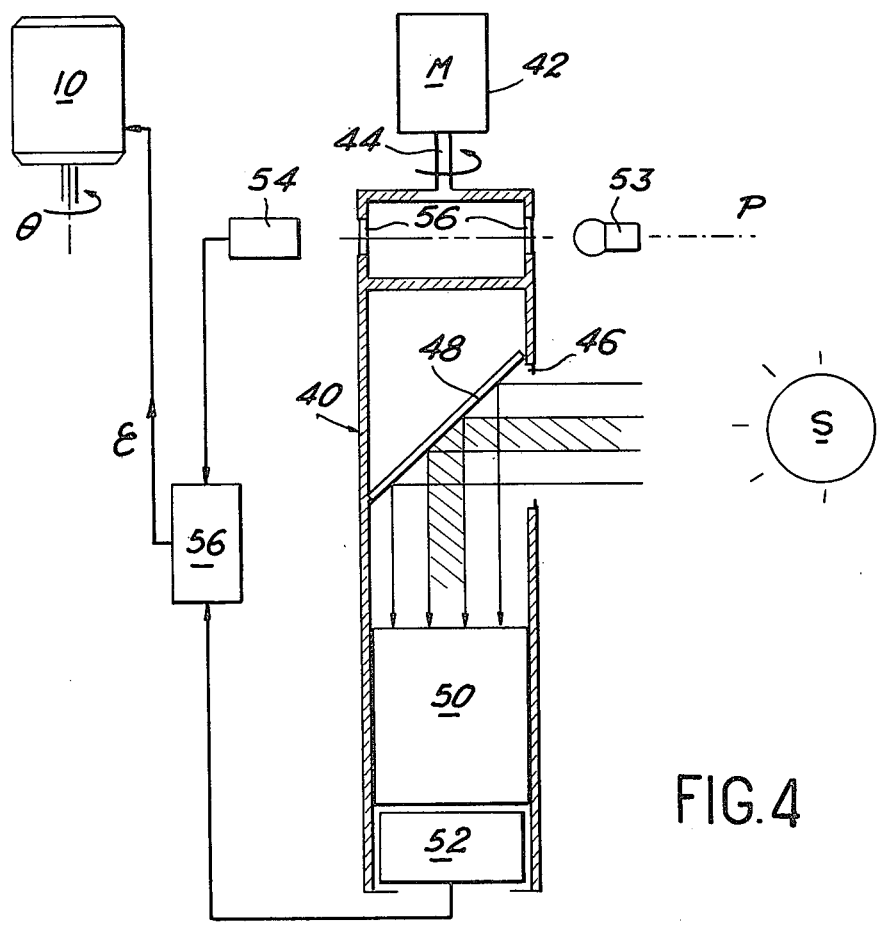
FIG. 4 is a sectional view of a pyrheliometer with collimating slit.
Figure 5:
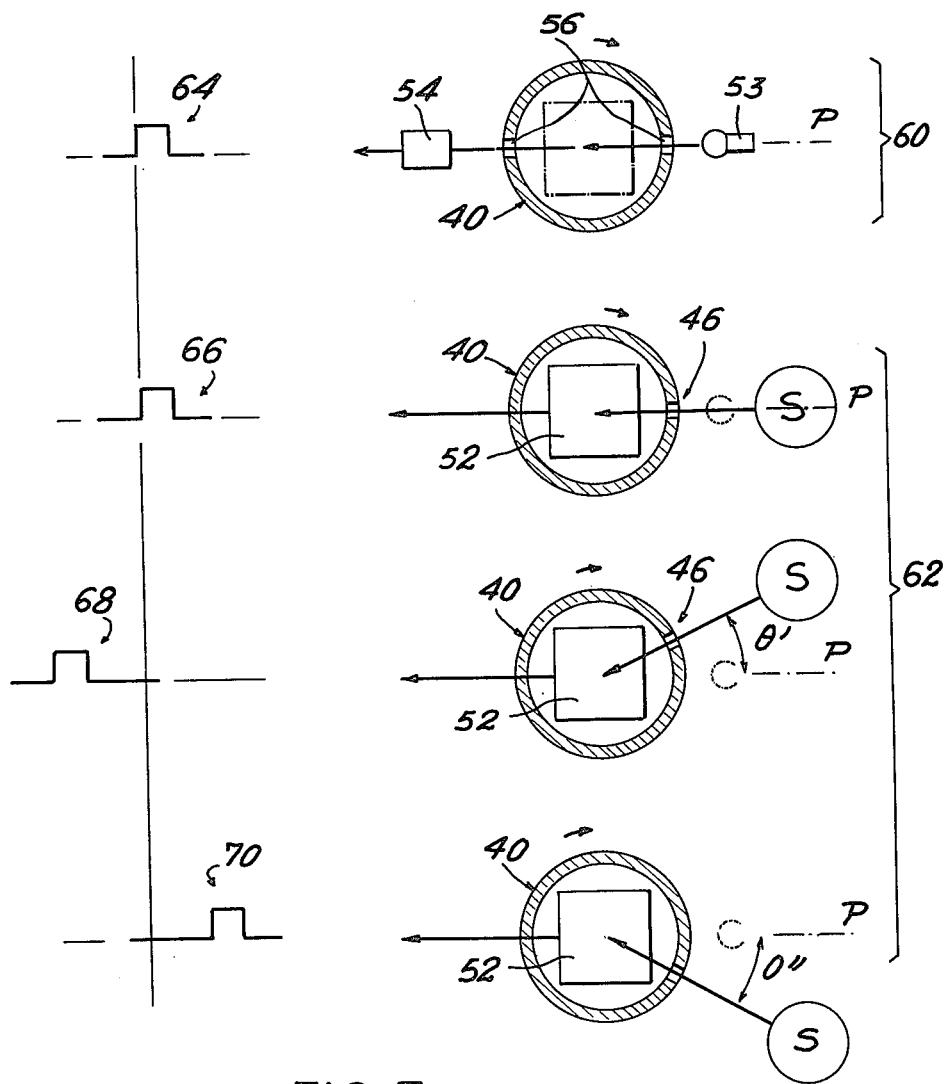
FIG. 5 illustrates the formation of the measuring and reference signals which serve to determine the angular difference between the direction of the sun and the direction of pointing.

Having thus described the design principle of the solar pointer in accordance with the invention, consideration will now be given to particular embodiments which are illustrated in FIGS. 4 and 5.

FIG. 4 is a sectional view of an alternative embodiment of a pyrheliometer with collimating slit. The pyrheliometer shown in the figure comprises a hollow tube 40 which is driven in a movement of rotation about the axis 44. This rotation is uniform and the angular velocity is higher than the rotational velocity of the earth about its own axis. The period of rotation can range from 1 second to 5 minutes, for example.

The pyrheliometer comprises a lower section having the design function of finding the direction of the sun and an upper section having the design function of determining the orientation of the pointing axis.

The lower section is essentially constituted by a collimating slit 46 and by an inclined mirror 48 from which the sun's rays are reflected to an optical guide 50, then to a photoelectric detector 52. Said detector delivers a so-called measuring pulse and the instant of appearance of this pulse characterizes the direction of the sun. The optical guide 50 can be constituted by any known optical means and especially by a bundle of optical fibers, by mirrors or by combinations of lenses.

The upper section of the pyrheliometer comprises a light source 53 and a photodetector 54, the design function of these two elements being to materialize the pointing axis of the device. Between the source and the receiver is placed a collimator which, in the alternative embodiment illustrated in the figure, is constituted by two slits 56. At each revolution of the cylindrical tube 40, the receiver 54 thus receives the light rays emitted by the source 53 and delivers an electrical pulse or so-called reference pulse, the instant of appearance of which characterizes the direction of the pointing axis P.

The time interval which elapses between the instants of appearance of the measuring pulses delivered by the detector 52 and the instants of appearance of the reference pulses delivered by the detector 54 represents the angular difference between the direction of pointing and the direction of the sun. The error signal which characterizes this difference is obtained by transmitting the reference and measuring pulses to electronic means 56 which produce a signal, one of the characteristics of which and especially the duration being proportional to the time interval which elapses between the instants of appearance of the pulses. As explained in the foregoing with reference to FIG. 3, this error signal $\epsilon$ is applied to the motor which controls the pivotal displacement of the pointer.

The constructional design of the electronic means 56 does not present any problem for anyone who is versed in the art. It is possible, for example, to employ two monostable circuits triggered by the measuring and reference pulses and then to perform the subtraction of the signals delivered by the monostable circuits, with the result that the pulse obtained is zero when the signals of the monostable circuits coincide, positive in one case and negative in the other according to which of the two monostable circuits is the first to change state. However, any other electronic means would be suitable, especially numerical means for counting-up or counting-down clock pulses during the time interval which elapses between the reference and measuring pulses.

The different relative positions which the two measuring and reference pulses are capable of occupying with respect to each other will be more clearly understood from FIG. 5. The right-hand portion of this figure shows two cross-sections of the pyrheliometer of FIG. 4 whilst the left-hand portion of the figure shows a chronogram in which the measuring pulses appear at the bottom and the reference pulses appear at the top. The upper portion 60 of the figure corresponds to a cross-section of the so-called reference means at the level of the source 53 and the receiver 54. The lower portion 62 of the figure corresponds to a cross-section at the level of the collimating slit 46, this cross-section being shown in three different cases.

The upper portion 60 of the figure shows the position of the hollow tube at the moment when the detector 54 is in direct line of access to the source 53 through the slits 56; at this instant, a reference pulse 64 is emitted by the photodetector 54. The lower portion 62 of FIG. 5 shows the three possible positions of the hollow tube at the instant of emission of said reference pulse: the first position is that in which the pointing axis is suitably oriented towards the sun; in this case, when the receiver 54 receives the light emitted by the source 53, the receiver 52 which is located at the base of the pyrheliometer receives simultaneously the solar rays which have passed through the collimating slit 46; the measuring pulse 66 is then emitted by the receiver 52 at the same instant as the reference pulse 64. The second case is that in which the direction of the sun precedes the pointing direction by an angle $\theta'$; the receiver 52 then receives the rays emitted by the sun before the receiver 54 receives the light emitted by the source 53; in this case the measuring pulse 68 precedes the reference pulse 64. The third case is that in which the pointing direction precedes the direction of the sun by an angle $\theta''$; the receiver 52 then receives the sun's rays after the receiver 54 has received the rays emitted by the source 53; in this case the pulse 70 delivered by the receiver 62 follows the reference pulse 64.

Figure 6:
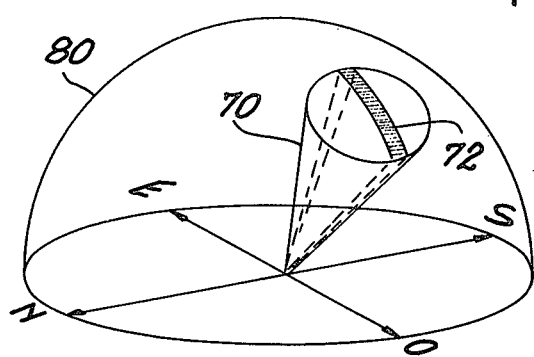
FIG. 6 illustrates the reduction of the aperture of a pyrheliometer which is achieved by making use of a collimating slit.

As has been pointed out in the foregoing, several types of pyrheliometer are suitable for the purpose of constituting periodic scanning means, especially devices of the heliograph type; however, the device shown in FIG. 4 is of particular interest since the use of a collimating slit results in the achievement of a higher degree of precision than conventional heliographs. In fact, in the event of adoption of a rotating device which is not provided with a collimating slit but with an elbowed light duct, for example, the solar radiation detector takes into account substantial perisolar diffuse radiation, thus reducing the accuracy of location of the sun. FIG. 6 shows diagrammatically the conical aperture 70 of an instrument of the pyrheliometer type without collimating slit and the reduced aperture 72 of substantially rectangular cross-section which is obtained by means of the instrument in accordance with the present invention. The surface areas swept by these two types of instrument on the celestial sphere 80 are proportional to the angular apertures. The area corresponding to the pyrheliometer with collimating slit is naturally much smaller and the degree of accuracy is improved accordingly. If so required, it would also be possible to take into account the error committed as a result of an excessive aperture of a pyrheliometer without collimating slit and to make a correction so as to take the diffuse radiation into account. This correction would prove very difficult, however, since diffuse radiation is a complex function of solar radiation both in amplitude and in angular distribution and, in particular, involves factors of a random character which are not directly accessible by a direct measurement. The use of a collimating slit in accordance with the invention makes it possible to overcome this disadvantage.

It has become apparent throughout the foregoing description that the scanning planes can be oriented in any direction. In one advantageous variant, however, one of the planes is the equatorial plane of the locus, in which case the associated axes of rotation and pivotal motion (which are perpendicular to this plane) are parallel to the earth's axis. In this case, in order to take into account seasonal variations in declination of the sun, the angular divergence of the collimating slit is approximately 50°, that is, ± 25° with respect to the equatorial plane. The sun's rays then fall perpendicularly to the axis of rotation of the pyrheliometer twice during the year when the sun is at its vernal point and at the opposite point; on the other hand, on June 21st and on December 21st, these rays make an angle of ± 23°27' with the scanning plane, this angle being smaller than the half-aperture of 25° of the instrument.

The pointer in accordance with the invention can serve to orient an apparatus for the use of solar energy or a measuring instrument (mirror, solar furnace, telescope and so forth). The solar pointer can therefore be fixed on the apparatus which it is desired to orient. It can also be mechanically independent while transmitting the electrical signals which are necessary for controlling the correct orientation of the apparatus. For example, in the case of a stationary boiler associated with a rotating mirror, the mirror must move through an angle having one-half the value of the angle of displacement of the pointer; but if the apparatus is a boiler associated with the focusing mirror, the displacement of said mirror is identical with that of the pointer. If the pointer is separated from the apparatus to be oriented, only one of the error signals can be transmitted to the apparatus if this latter has an axis of rotation which is oriented parallel to the earth's axis and has an angular aperture of greater value than the seasonal variations in declination of the sun; in this case the single error signal controls the rotation of the apparatus only in the equatorial plane.

In another application, the pointer serves to measure light intensity and its daily and annual variations. In this application, the pyrheliometers must be calibrated.

We claim:

1. A solar pointer which is capable of pivoting about two perpendicular axes, each pivotal movement being controlled by a motor, wherein said pointer comprises two pyrheliometers for carrying out in each case periodic scanning in a plane at right angles to one of the two pivotal axes aforesaid, each pyrheliometer being provided with a receiving unit which rotates about an axis at right angles to the scanning plane and being associated with means for measuring the angular difference between the direction of the sun projected on the scanning plane and the direction of the pointing axis projected on said plane and for delivering an electrical pointing error signal which is proportional to said angular difference, said error signal being applied to the motor which serves to drive the pointer in pivotal motion about the axis located at right angles to the scanning plane in order to cancel said error signal and cause the two directions to coincide in the scanning plane, the pointing axis of the pointer being then directed towards the sun when the two error signals have thus been cancelled.

2. A solar pointer according to claim 1, wherein each pyrheliometer comprises a hollow tube driven by suitable means in a uniform movement of rotation about its axis and optical means rigidly fixed to said tube and oriented in the direction of the sun at each revolution so that the sun's rays received by said means are directed through said tube to a photoelectric receiver which delivers an electrical pulse or so-called measuring pulse at each revolution of said tube.

3. A solar pointer according to claim 2, wherein said pointer comprises means for delivering an electrical pulse or so-called reference pulse when said optical means rigidly fixed to the hollow rotating tube are oriented in the direction of the pointing axis of the pointer, the error signal being accordingly constituted by a signal which is proportional to the time interval between the instants of appearance of the measuring pulse and of the reference pulse.

4. A solar pointer according to claim 3, wherein the means for delivering the reference pulse comprise a light source and a photoelectric detector aligned in parallel relation to the pointing axis of the pointer and a collimation system placed between the source and the detector and driven in the same movement of rotation as the hollow tube, the receiver being intended to receive the light emitted by said source at each revolution of the tube and then to deliver said reference pulse.

5. A solar pointer according to claim 4, wherein the collimation system is constituted by two diametrically opposite slits pierced in a hollow rotating cylinder which is rigidly fixed to the hollow tube of the pyrheliometer.

6. A solar pointer according to claim 2, wherein at least one of the pyrheliometers has a collimating slit of substantial length in the direction parallel to the axis of rotation of the hollow tube and of small width in the perpendicular plane.

7. A solar pointer according to claim 2, wherein the optical means which are rigidly fixed to the hollow rotating tube of each pyrheliometer are constituted by a mirror which is inclined to the axis of rotation of the tube and from which the sun's rays are reflected within the tube towards an optical duct.

8. A solar pointer according to claim 1, wherein the axis of rotation of one of the pyrheliometers is parallel to the earth's axis.

9. A solar pointer according to claim 6, wherein the pyrheliometer whose axis of rotation is parallel to the earth's axis is provided with a collimating slit having an angular aperture which is larger than the seasonal variations in declination of the sun.

* * * * *